Nov. 15, 1949  J. G. RITTER  2,488,435
LIQUID COOLING APPARATUS
Filed June 3, 1948
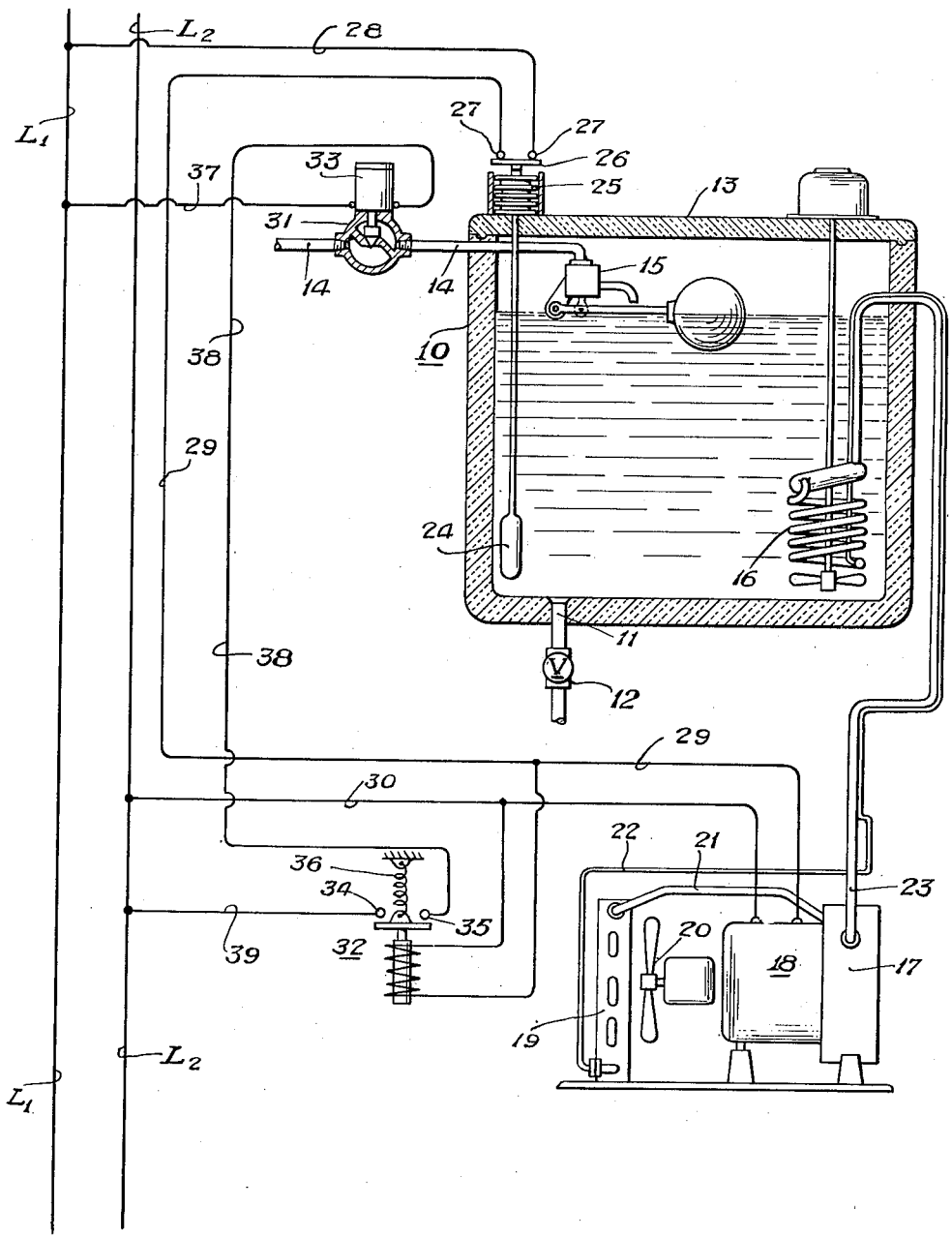
WITNESSES:
Wm J. Swezey
D. J. McCarty
INVENTOR
JOHN G. RITTER
BY 
ATTORNEY Patented Nov. 15, 1949

2,488,435

UNITED STATES PATENT OFFICE 2,488,435

LIQUID COOLING APPARATUS

John G. Ritter, Springfield, Mass., assignor to Westinghouse Electric Corporation, East Pittsburgh, Pa., a corporation of Pennsylvania Application June 3, 1948, Serial No. 30,919

3 Claims. (Cl. 62—141)

This invention relates to a liquid cooling apparatus, and particularly, to apparatus in which cooled liquid is stored in a tank or reservoir to be dispensed at a predetermined temperature as needed. The invention is particularly adapted for a system in which the liquid is cooled by an electrically-operated mechanical refrigeration system and responsive in its operation to the temperature of the stored liquid.

It is further particularly adapted to a liquid cooling system in which the liquid to be cooled is admitted to the cooled liquid storage tank under the control of a device responsive to the level of the liquid in that tank.

In systems where the stored liquid is to be dispensed at or near a predetermined low temperature, it is desirable that there be some control of the flow of incoming liquid so that an inordinate amount of warm liquid may not be supplied to the tank during periods of extensive withdrawal of cooled liquid from the tank. Otherwise, the temperature of the remaining stored liquid would be raised considerably above that considered satisfactory for the purpose for which the liquid is to be used, for example, beverage purposes, particularly if there is a continued demand on the stored liquid.

Further, if a refrigerating system were used which would be capable of rapidly cooling the entire body of fresh liquid supplied to the tank after the supply of stored cooled liquid had been substantially depleted, this being a period of peak draw, such a system would need a capacity inordinately large compared with that required for the period of normal demand on the cooled liquid.

It is, therefore, desirable that the supply of water to be cooled be controlled more nearly in accordance with the cooling capacity of a refrigerating system which is capable of satisfying the cooling requirements during a period of normal demand but which would be inadequate during a period of peak demand.

An object of the invention, therefore, is to provide an improved refrigerated liquid cooling system of the character described.

More specifically an object is to provide such a system in which the supply of liquid to be cooled is controlled by the period of operation of the refrigerating system, that is, when the refrigerating system is operating, indicating a need to reduce the temperature of the stored liquid, the supply of liquid to the tank is automatically interrupted and remains so until the refrigerating system is shut off.

These and other objects are effected by the invention as will be apparent from the following description and claims taken in connection with the accompanying drawings, forming a part of this application, in which:

In the drawings, the single figure denotes a liquid cooling system embodying the aforesaid inventive features.

Numeral 10 denotes an insulated storage tank in which liquid is cooled and stored until withdrawn through an outlet duct 11 under control of a normally closed valve 12. The tank is preferably provided with a removable cover 13. Liquid to be cooled is supplied to the tank near its upper end from any source under pressure through a conduit 14 and under control of a liquid-level responsive device of any selected type which permits admission of liquid to the tank when the stored water has reached a predetermined low level and shuts off the flow of liquid when a predetermined high level has been reached. Such a control is schematically shown here as a common float-operated valve 15.

The liquid in the tank is cooled by a mechanical refrigerating system here shown as comprising a refrigerant evaporator 16 disposed in the tank and a motor-driven condensing unit disposed outside the tank. The condensing unit comprises a compressor 17 driven by a motor 18, and a condenser 19. A motor-driven fan 20 may be provided to cool the condenser. The compressor and condenser are connected by a conduit 21 and the condenser 19 is connected to the evaporator 16 by a pressure reducing tube 22. A suction conduit 23 connects the evaporator with the compressor 17.

The starting and stopping of the motor 18, and consequently, the operation of the refrigerating system, is controlled by a temperature-responsive device comprising a thermostatic bulb 24 disposed in the tank 10 near its bottom wall. The bulb 24 contains an expansible medium which influences the expansion and contraction of a flexible motor such as bellows 25. The bellows 25 in turn controls a movable contact member 26 which makes or breaks a circuit through stationary contact members 27, depending on the condition of the medium in the pressure-responsive system comprising the bulb 24 and bellows 25.

Thus when the bellows 25 is expanded, indicating that refrigeration is required in tank 10, contacts 26 and 27 are closed so that a circuit is set up through motor 18 from line conductor $L_1$ through conductor 28 and the aforesaid contacts 26, 27, then through conductor 29 to motor 18 and conductor 30 to line conductor $L_2$. The motor continues to operate until the temperature in tank 10 is sufficiently reduced to contract the medium in the bulb 24, whereupon the motor circuit is broken by separation of contacts 26 and 27.

It is apparent that when the motor and compressor are running, the temperature of the liquid in tank 10 is above that considered desirable and, therefore, that no uncooled liquid should be added to the tank through conduit 14 during that time even though the supply in the tank be so depleted that the liquid level valve 15 is open.

To this end I provide a solenoid-operated valve 31 in the supply line 14 in series with the valve 15 and I also provide a solenoid relay 32 in parallel with compressor motor 18. The solenoid 33 of valve 31 is connected in series with the relay 32 so as to be directly influenced by the operation of the relay through contacts 34, 35 which contacts are controlled by the relay.

When the motor 18 is at rest the relay 32 is deenergized and contacts 34, 35 are biased to closed position under the influence of spring 36. Thereby a circuit is closed through solenoid 33 from line conductor L1 through conductor 37, solenoid 33, conductor 38, contacts 34, 35 and conductor 39 to line conductor L2. When the solenoid 33 is so energized, valve 31 is held open and liquid supply to tank 10 is solely under control of valve 15. This condition prevails as long as the liquid stored in the tank is sufficiently cool to maintain the contacts 26, 27 open. However, when the liquid in the tank becomes warm enough to require refrigeration contacts 26, 27 close, whereupon motor 18 operates and also relay 32 is energized to separate contacts 34, 35. When the latter are separated, the solenoid 33 is deenergized and valve 31 seats to prevent admission of liquid to the tank 10 regardless of the position of liquid-level responsive valve 15. It is not until the stored water has been cooled to the required temperature that motor 18 and relay 32 are deenergized, whereupon solenoid 33 is energized to unseat valve 31 to permit water to be added to the tank.

It is apparent from the foregoing description that the invention provides an extremely simple and effective system for controlling the addition of liquid to be cooled to a tank in which cooled liquid is stored, without imposing an undue load on the refrigerating system provided to cool the stored liquid.

While the invention has been shown in but one form, it will be obvious to those skilled in the art that it is not so limited, but is susceptible of various changes and modifications without departing from the spirit thereof.

What I claim is:

1. Liquid cooling apparatus comprising a reservoir for liquid to be cooled and to be stored when cooled, means for supplying liquid to said tank, means responsive to the level of liquid in the tank for controlling the admission of liquid thereto, electrically-operated refrigerating means for cooling the liquid in the tank, valve means in series with the liquid-level responsive means for also controlling admission of liquid to the tank, and electrically responsive means in circuit with the electrically-operated refrigerating means for controlling the operation of the aforesaid valve means whereby liquid may be supplied to the tank only when the refrigerating means is deenergized.

2. Structure according to claim 1 in which the valve means controlling admission of liquid to the tank is electrically operated.

3. Structure according to claim 2 in which an electrically-operated relay is disposed in parallel with the electrically-operated refrigerating means and in series with the electrically-operated valve means whereby the latter is closed to prevent admission of fluid to the tank when the electrically-operated refrigerating means is operating.

JOHN G. RITTER.

REFERENCES CITED

The following references are of record in the file of this patent:

UNITED STATES PATENTS

| Number | Name | Date |
|---|---|---|
| 2,432,546 | Tanner | Dec. 16, 1947 |